Patented June 28, 1938

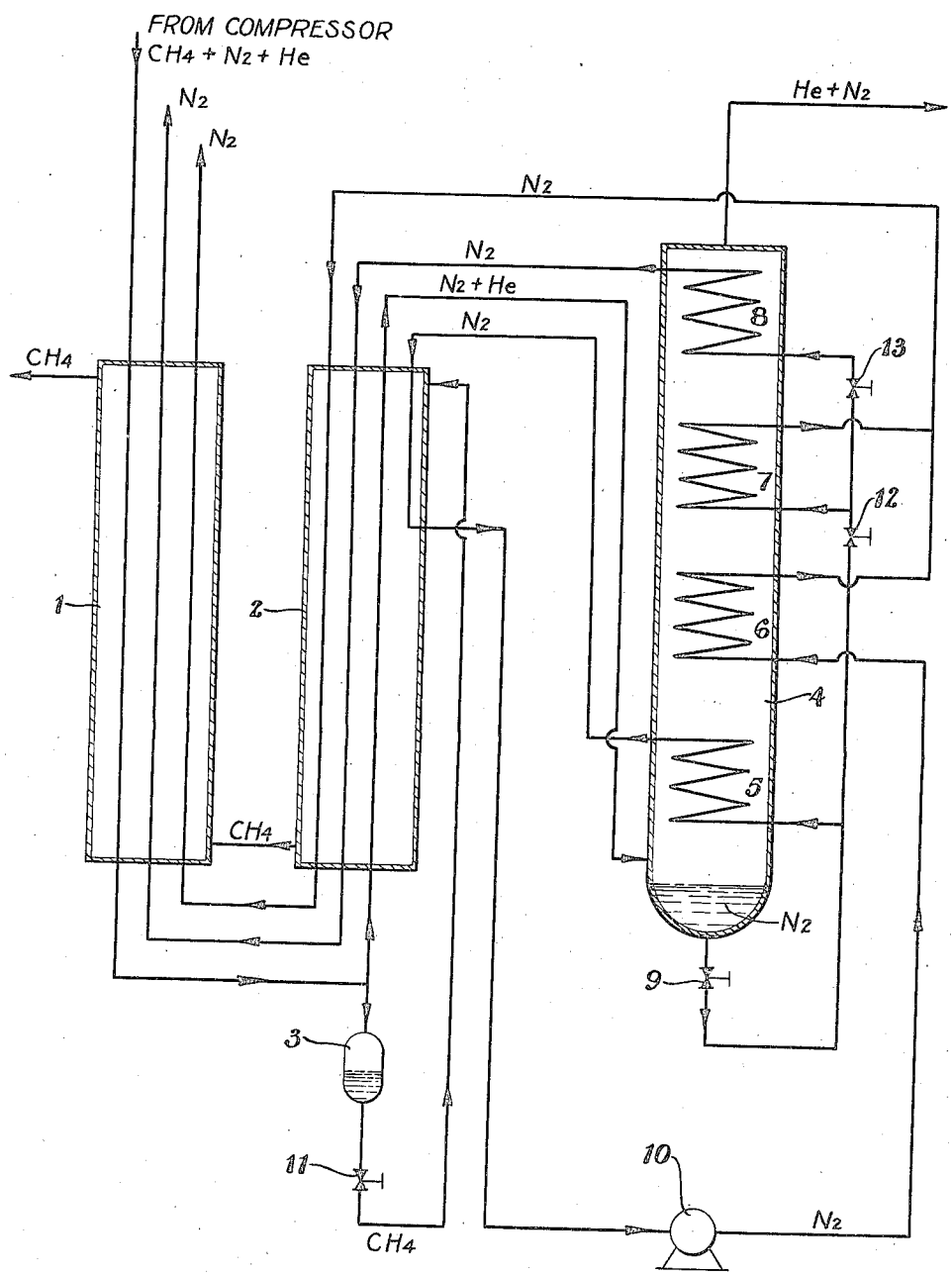

2,122,238

UNITED STATES PATENT OFFICE 2,122,238

PROCESS AND APPARATUS FOR THE SEPARATION OF GAS MIXTURES

Franz Pollitzer, Grosshesselohe, near Munich, Germany, assignor, by mesne assignments, to Union Carbide and Carbon Corporation, a corporation of New York Application March 20, 1935, Serial No. 12,115
In Germany March 23, 1934

12 Claims. (62—175.5)

This invention relates to the separation of gas mixtures through cooling and fractional condensation, having special reference to a novel process and apparatus for effecting such separation.

In the separation of gas mixtures through fractional condensation at low temperatures, the cold necessary for replacing cold losses is often obtained by expanding a portion of the separation products with the production of external work. The amount of cold so obtained is larger than with simple expansion, and as a result the separation can be carried out at a lower pressure and with a correspondingly lower power consumption.

Heretofore, however, expansion with the production of external work could only be effected with fractions which remained in a gaseous state during the cooling. The components separated in a liquid state, on the other hand, were always expanded by throttling, since an expansion of liquids with the production of work and cold is generally impossible. However, there are instances in the separation of gas mixtures through fractional liquefaction in which no or only very small fractions remain in a gaseous state.

Accordingly, the principal object of the present invention is to provide a process of the character indicated which makes possible the expansion of one or more liquid fractions with the production of external work for compensating cold losses, which is advantageous from the standpoint of refrigeration technique and economy.

This and other objects of this invention, together with the novel features thereof which achieve these objects, will become evident in the following description, having reference to the accompanying drawing in which the single figure is a diagrammatic arrangement of one embodiment of apparatus illustrating the novel process of this invention.

In accordance with this invention, the principal characteristic of the novel process is that first a liquid fraction which has been separated by condensation at separation pressure is evaporated at a pressure which lies between the separation pressure and atmospheric pressure, and then the resulting vapors are warmed to a slight degree by heat exchange with fresh gas and expanded with the production of external work, after which the expansion cold is transferred to the fresh gas.

The process will be more fully explained and readily understood by reference to the drawing, showing, as an example, the production of helium (He) from a natural gas whose principal components, in addition to helium, are nitrogen ($N_2$) and methane ($CH_4$). Following the customary preliminary purification, the gas is brought to a pressure of, for example, 25 atm. and is then cooled in a counter-current cooler 1 in heat exchange with the separation products to approximately the dew point of the methane. If the gas mixture contains components which can be utilized as gasoline, these can be recovered by cooling in this stage, so that it is preferable under these conditions to construct the heat-exchanger 1 in the form of a reflux condenser. If it is not desired to recover the gasoline components, it is possible to replace the counter-current cooler 1 with periodically alternating cold accumulators, through which the preliminary purification of the gas mixture is eliminated.

The methane is liquefied by means of further cooling in a reflux condenser 2, so that the lowest boiling point fraction, which contains practically pure nitrogen, and in addition contains only the helium, passes out at the top. The methane falling into a separator 3 is expanded through a valve 11 and then evaporated at atmospheric pressure for the purpose of cooling the reflux condenser 2.

The nitrogen containing the helium is conducted into an additional reflux condenser 4. The liquefied nitrogen collects at the bottom of the latter, while the helium, together with a small residue of nitrogen, passes out the top of the condenser.

The condensation of the major portion of the nitrogen is accomplished in the lower section 5 of the reflux condenser 4. The liquid evaporating by heat exchange with this nitrogen is evaporated in accordance with the present invention, at a pressure which lies between the condensation pressure and atmospheric pressure. The major portion of the liquid nitrogen occurring in the reflux condenser 4 is therefore first expanded through a valve 9 to only approximately 5 atm. and evaporated at this pressure by condensing nitrogen in the section 5 of the reflux condenser 4. The resulting vapors are somewhat warmed by heat exchange with fresh gas in the counter-current cooler 2 and thereupon expanded with the production of external work in a turbine 10, instead of which a piston engine, or other suitable expansion engine, may also be used. The warming of the vapors prior to expansion need be only to such a degree that no liquefaction will result during the expansion. The cold exhaust gases leaving the turbine 10 are utilized for cooling the section 6 of the condenser 4.

An additional portion of the liquid nitrogen occurring in the reflux condenser 4 is evaporated at atmospheric pressure in section 7 of this condenser after expansion through a valve 12, and the remainder is evaporated under a vacuum in section 8 after expansion through a valve 13 in order that the partial pressure of the nitrogen in the nitrogen-helium mixture which is produced as the end product of the separation will be as low as possible. The evaporation products of the individual fractions are warmed in the usual manner by counter-current heat exchange with the fresh gas.

The principal advantage of the new process is that a relatively low separation pressure suffices without the addition of liquid nitrogen or other auxiliary cooling medium from a separate liquefaction plant for compensating cold losses, as was required with the heretofore practiced methods of separation at relatively low pressures. The result is increased simplicity and economy of operation.

The process is not limited to the embodiment described as an example, but can be employed in all those cases in which a gas mixture is separated through partial condensation and larger quantities of liquid fractions than vapor fractions are obtained. It can also be employed advantageously when a larger quantity remains gaseous at the lowest temperature if it is desired to recover the fraction remaining in gaseous form at separation pressure. Of the individual liquid fractions, it is generally preferable to evaporate the lowest-boiling fraction at a pressure above atmospheric and expand the resulting vapors, after slight warming, with the production of external work, in order that the expansion cold is obtained at the lowest possible temperatures. It is, however, also possible to utilize a higher-boiling fraction in accordance with the present invention for the production of cold if there is a special demand for refrigeration at higher temperatures. Thus, in the above-described example, in addition to evaporating and expanding a portion of the nitrogen, it would also be possible to evaporate a portion of the methane under a pressure higher than atmospheric and to expand the vapors with the production of external work.

It will, of course, be understood that various changes may be made in the herein-described novel process and apparatus without departing from the principles or exceeding the scope of this invention as defined in the appended claims.

I claim:

1. Process for the separation of gas mixtures by cooling and fractional condensation at pressures above atmospheric which includes the steps of collecting liquid fractions while at the condensation pressure, expanding the lowest boiling liquid fraction collected to a pressure intermediate between said condensation pressure and atmospheric pressure, warming said expanded fraction by heat exchange with portions of gas to be condensed, further expanding with the production of external work a portion of said expanded fraction, further expanding the remaining portion of said fraction, and cooling additional portions of the gas mixture by heat exhange with both said expanded portions.

2. Process for the separation of gas mixtures by cooling and fractional condensation at pressures above atmospheric which includes the steps of collecting liquid fractions while at the condensation pressure, expanding the lowest boiling liquid fraction collected to a pressure intermediate between said condensation pressure and atmospheric pressure, warming said expanded fraction by heat exchange with portions of gas to be condensed, further expanding with the production of external work a portion of said expanded fraction, regulating the warming of the portion to be further expanded so that no liquefaction occurs during the expansion with external work, further expanding the remaining portion of said fraction, and cooling additional portions of the gas mixture by heat exchange with both said expanded portions.

3. Process for the separation of gas mixtures by cooling and fractional condensation at pressures above atmospheric which includes the steps of collecting liquid fractions while at the condensation pressure, expanding the lowest boiling liquid fraction to a pressure intermediate between said condensation pressure and atmospheric pressure, further expanding a portion of said expanded fraction to produce low temperature cold, heating another portion of said expanded fraction by heat exchange with portions of said mixture, further expanding said last-mentioned portion with the production of external work, controlling said heating to a temperature such that the temperature after expansion with external work is above the condensation temperature corresponding to the pressure after the expansion, and cooling additional portions of the gas mixture by heat exchange with both further expanded portions.

4. Process for the separation of gas mixtures by cooling and fractional condensation at pressures above atmospheric which includes the steps of collecting liquid fractions while at the condensation pressure, expanding the lowest boiling liquid fraction to a pressure intermediate between said condensation pressure and atmospheric pressure, expanding a portion of said expanded fraction to substantially atmospheric pressure, expanding another portion of said expanded fraction to a sub-atmospheric pressure, expanding still another portion of said expanded fraction with the production of external work, and subjecting additional portions of the gas mixture to heat exchange with each of said expanded portions so as to cool the mixture to successively lower temperatures, the portion expanded to subatmospheric pressure being arranged to effect the final cooling.

5. Process for separating helium from natural gas containing methane, nitrogen, and helium through cooling and fractional condensation under pressure, which includes the steps of liquefying said methane in a reflux condenser, liquefying said nitrogen in a reflux condenser, evaporating at least a portion of said liquefied nitrogen at a pressure between its separation pressure and atmospheric pressure, warming the resulting nitrogen by heat exchange with the incoming gas to such a degree that no liquefaction will occur during the following expansion, expanding said warmed nitrogen vapor with the production of external work, and utilizing the resulting cold to liquefy more nitrogen and methane by passing said expanded nitrogen vapor in heat exchange relation thereto.

6. Process for separating helium from natural gas containing methane, nitrogen, and helium through cooling and fractional condensation, which includes the steps of liquefying said methane, liquefying said nitrogen, evaporating at least a portion of said liquefied methane and nitrogen at pressures between their separation pressures and atmospheric pressure, warming the resulting methane and nitrogen vapors to such a degree that no liquefaction will occur during the following expansions, expanding said warmed methane and nitrogen vapors each with the production of external work, and utilizing the resulting cold to compensate cold losses.

7. Apparatus for the separation of gases through cooling and fractional condensation under pressure, comprising the combination of a cooler for the gas, means for separately condensing liquid fractions from said gas, means for evaporating a portion of the lowest boiling liquid fraction at an intermediate pressure, means for warming the resulting vapors by heat exchange with said gas, means for expanding said warmed vapors with the production of external work, means for expanding the remainder of the lowest boiling fraction to a relatively low pressure, and means for transferring the resulting cold of each expansion to said gas to compensate cold losses.

8. Apparatus for separating helium from natural gas containing methane, nitrogen, and helium by cooling and fractional condensation, comprising the combination of a compressor for compressing said gas, means for cooling said gas, a reflux condenser for liquefying said methane, a reflux condenser for liquefying said nitrogen, means for evaporating at least a portion of said nitrogen at a pressure between the compression pressure of said gas and atmospheric pressure, means for warming the resulting nitrogen vapor by heat exchange with said gas, means for expanding said warmed nitrogen vapor with the production of external work, and means for passing the resulting expanded and cold nitrogen vapor in heat exchange relation to nitrogen in said nitrogen condenser and to gas in said methane condenser.

9. Process for the separation of gas mixtures through cooling and fractional condensation at a pressure above atmospheric which includes the steps of collecting a liquid fraction having a relatively low boiling point, dividing said fraction into two portions, evaporating one of said portions at a pressure intermediate between the pressure of condensation and atmospheric pressure, warming the resulting vapors by heat exchange with portions of gas to be condensed to a degree such that no liquefaction of said vapors will occur during the following expansion, expanding said warmed vapors with the production of external work to cool said vapors to a relatively low temperature, cooling by heat exchange with said expanded vapors additional portions of gas to be condensed, and evaporating the remaining portion of said liquid fraction under a pressure lower than said intermediate pressure by heat exchange with additional portions of gas to be condensed.

10. Process for separating a helium concentrate from natural gas containing mainly methane, nitrogen, and helium by cooling and fractional condensation under pressure which includes the steps of separating said methane, condensing and collecting a liquefied nitrogen fraction, evaporating a portion of said liquefied nitrogen at a reduced pressure and in heat exchange with portions of said natural gas to condense more nitrogen, evaporating another portion of said liquefied nitrogen at a pressure between its separation pressure and atmospheric pressure, warming the resulting nitrogen vapor by cooling additional portions of natural gas therewith, expanding said warmed nitrogen vapor with the production of external work, and utilizing the cold of said expanded nitrogen to compensate for cold losses.

11. Process for separating a helium concentrate from natural gas containing mainly methane, nitrogen and helium by progressive cooling and fractional condensation under a pressure above atmospheric which comprises condensing and separating a methane fraction, condensing and separating a nitrogen fraction, withdrawing a helium concentrate while at the said pressure, separately expanding all of said methane fraction and all of said nitrogen fraction, and effecting the liquefaction of said methane and said nitrogen fractions solely by separate and successive heat exchange with the expanded methane and nitrogen fractions.

12. Process for separating a helium concentrate from natural gas containing mainly methane, nitrogen and helium by progressive cooling and fractional condensation under a pressure above atmospheric which comprises condensing and separating a methane fraction, condensing and separating a nitrogen fraction, withdrawing a helium concentrate while at the said pressure, separately expanding all of said methane fraction and all of said nitrogen fraction, effecting the liquefaction of said methane and said nitrogen fractions solely by separate and successive heat exchange with the expanded methane and nitrogen fractions, and further expanding with the production of external work a portion of said expanded nitrogen fraction to produce additional cold for compensating cold losses.

FRANZ POLLITZER.